United States Patent [19]

Foss

[11] 4,415,342
[45] Nov. 15, 1983

[54] AIR POLLUTION CONTROL PROCESS
[75] Inventor: George D. Foss, River Falls, Wis.
[73] Assignee: Minnesota Mining and Manufacturing Company, St. Paul, Minn.
[21] Appl. No.: 368,096
[22] Filed: Apr. 14, 1982

Related U.S. Application Data

[62] Division of Ser. No. 190,196, Sep. 24, 1980, Pat. No. 4,348,362.

[51] Int. Cl.³ .............................................. B01D 50/00
[52] U.S. Cl. ........................................ 55/96; 55/60; 55/77; 55/97; 55/208; 55/DIG. 10; 55/525; 55/528; 423/245
[58] Field of Search ................. 55/282, 290, 301, 316, 55/387, 389, 390, 466, 487, 523, 525, 528, DIG. 10, 60, 77, 96, 181, 208, 97; 422/169, 171, 178, 181, 182, 172; 423/245, 245 S

[56] References Cited

U.S. PATENT DOCUMENTS

| | | | |
|---|---|---|---|
| Re. 27,747 | 9/1973 | Johnson | 165/166 |
| 2,211,812 | 8/1940 | Colbert | 55/DIG. 10 |
| 3,085,348 | 4/1963 | Adey et al. | 55/DIG. 10 |
| 3,395,972 | 8/1968 | Hardison | 55/DIG. 10 |
| 3,658,724 | 4/1972 | Stiles | 252/446 |
| 3,713,865 | 1/1973 | Leeds | 252/516 |
| 3,770,487 | 11/1973 | Gibson et al. | 106/57 |
| 3,793,041 | 2/1974 | Sowman | 106/57 |
| 3,795,524 | 3/1974 | Sowman | 106/65 |
| 3,853,567 | 12/1974 | Verbeek | 106/44 |
| 3,892,583 | 7/1975 | Winter et al. | 106/65 |
| 3,908,367 | 9/1975 | Bauman | 60/280 |
| 3,930,803 | 1/1976 | Winter | 55/287 |
| 3,950,478 | 4/1976 | Kenworthy et al. | 264/234 |
| 3,982,955 | 9/1976 | Mansmann et al. | 106/307 |
| 4,047,965 | 9/1977 | Karst et al. | 106/65 |
| 4,149,862 | 4/1979 | Sewell, Sr. | 55/316 |
| 4,206,083 | 6/1980 | Chang | 252/455 R |

FOREIGN PATENT DOCUMENTS

| | | | |
|---|---|---|---|
| 51-32482 | 3/1976 | Japan | 55/290 |
| 612108 | 6/1978 | U.S.S.R. | 55/390 |

Primary Examiner—David L. Lacey
Attorney, Agent, or Firm—Donald M. Sell; James A. Smith; Lorraine R. Sherman

[57] ABSTRACT

An air pollution control process employing an improved rotatable collector, which by its position becomes a filtering and adsorbing station and a combustion and desorbing station, and an oxidizer are utilized in an apparatus and process for removing airborne particulate materials and organic vapors from an air stream. The rotatable collector comprises an assembly of alternate layers of refractory microfiber, metal screens, and a thin layer of adsorbent carbon.

2 Claims, 4 Drawing Figures

AIR POLLUTION CONTROL PROCESS

This is a division of application Ser. No. 190,196 filed Sept. 24, 1980, now U.S. Pat. No. 4,348,362.

FIELD OF THE INVENTION

This invention relates to the removal of pollutants in gas streams and more particularly to apparatus and a method for the removal of organic vapors and airborne particulate matter from an air or gas stream.

BACKGROUND ART

The removal of obnoxious, odorous materials from gas streams, whether they are in industrial, commercial, or domestic environments, is a problem that is rapidly becoming more serious each year. Environmental control agencies are instigating increasingly stringent regulations to control objectionable emissions of all types, and at the same time a nation-wide energy crisis demands a reduction in the use of fuels for this purpose. Processes for the removal of pollutants from a gas stream utilizing incineration, adsorption, impingement, electrostatic attraction, centrifugation, sonic agglomeration, and ozonization are known. The most common of these processes in use at present appears to be incineration by direct flame or catalytic oxidation. Although these processes will remove particulates and organic vapors from a gas stream, they do so only with the expenditure of large amounts of energy and/or adsorbent material. Such processes may be non-continuous and therefore require interruption of the process, or they may employ oxidation catalysts subject to poisoning, and therefore are not entirely satisfactory.

U.S. Pat. No. 3,658,724 discloses an adsorbent catalyst for use in the removal of odorous and combustible components from the effluent gases of cooking and other processes by passing the effluent gases through a bed of the adsorbent catalyst and continuously or cyclicly oxidizing (by using a metallic oxidation catalyst known in the art which is incorporated in the adsorbent catalyst) the adsorbed components by increasing the temperature up to 300° C.

U.S. Pat. No. 3,908,367 discloses a process for cleaning exhaust fumes from a combustion device by causing them to flow through a moving filter that is continually cleaned by air flowing through the filter in the direction opposite to the flow of exhaust fumes therethrough, and thence into the combustion device for reburning certain fume products captured by the filter. The filter useful in such a process captures mainly unburned carbon and metal particles and will not adsorb an appreciable amount of vapors, and even if it did adsorb vapors, there is no step of the process which would allow for desorption of the vapors so that these vapors could be subjected to reburning in the combustion device.

U.S. Pat. No. 3,930,803 discloses apparatus for purifying a gas stream of combustible vapors by passing the stream through an adsorption filter and charging the filter with combustible impurities to a predetermined level whereon, in a cyclic operation, the stream is interrupted and the filter is desorbed by passing a heated inert gas generated by stoichiometric burning of hydrocarbons through the filter, or the gas flow is switched from a saturated to a regenerated adsorption filter. The inert gas enriched with desorbate flows to a second burning chamber where air is added and the desorbate burned. Such a process is not continuous and does not provide for the removal and disposal of combustible particulate material in a gas stream.

Assignee's copending patent application, U.S. patent application Ser. No. 21,997, filed Mar. 19, of 1979 and now abandoned in the names of C. Davis, G. Foss, and T. Shevlin, discloses a system for the removal of particulate material from an air stream in a continuous, energy-efficient process. The improved collector of the present invention provides for the removal of organic vapors as well as particulate matter from a gas stream and affords the removal of at least 85%, and preferably at least 95%, of the total organic content of an air stream.

The superior energy efficiency of the collector of the present invention results from the use of much thinner adsorbent beds than is used in prior art apparatus. These thinner beds require much less energy for their regeneration. In addition, the concentration of organic vapors realized by use of the collector of the present invention makes possible a reduced energy requirement for the processing of this concentrated stream.

SUMMARY OF THE INVENTION

The present invention provides a process and apparatus for continuously removing airborne particulate material and organic vapors from a polluted air stream, the process comprising the steps of:

(1) collecting from an air stream, by filtration and adsorption, particulate material and organic vapors, thus forming an essentially pollutant-free effluent, (2) burning the collected particulate matter and simultaneously desorbing the collected organic vapors, thus forming a concentrated stream comprising combustion products of particulate material and desorbed vapors, (3) oxidizing the desorbed vapors of the concentrated stream to form an essentially pollution-free oxidized stream comprising both particulate material combustion products and vapor combustion products, and (4) exhausting, separately, the essentially pollutant-free effluent of step (1) and the essentially pollutant-free oxidized stream of step (3);

said process taking place in an apparatus comprising:

(1) a housing having an inlet plenum for introduction of a polluted air stream thereinto, (2) a rotatable collector located within said housing, said collector, by its position being (a) a filtering and adsorption station for particulate matter and organic vapors, and having connecting means therefrom to an outlet plenum for exhausting the resultant pollutant-free air stream, and (b) a combustion and desorption station for combustion of particulate matter and desorption of organic vapors, (3) oxidizing means for converting the desorbed vapor into oxidized pollutant-free products, (4) connecting means for providing passage for the resultant combustion products and desorbed vapors from the combustion and desorbing station to the oxidizing means, (5) connecting means for providing passage for the combustion and oxidized products from the oxidizing means to the atmosphere or, optionally, back to the inlet plenum, and (6) means for moving the rotatable collector continuously from the filtering and absorbing station to the combustion and desorbing station.

The term "pollutant-free" as used herein is defined in accordance with the definition given by Rule 442 of the State of California South Coast Air Quality Management District Rules and Regulations adopted May 7, 1976 and amended July 6, 1979. This definition states: "Pollution-free" is the term applied to the treated effluent from a source emitting an air stream having a carbonaceous content that has had its total carbonaceous content reduced either 90% by thermal oxidation to carbon dioxide and water or 85% by adsorption. This rule is generally accepted by the trade as being the most stringent set forth to date.

The present invention, utilizing an improved collector, provides a method and means of air pollution control that is superior to those of the prior art. Herein is provided an energy- and adsorbent material-efficient method for continuous removal of both airborne particulate material and organic vapors from an air stream, by which method the total organic content of an air stream is reduced by at least 85%, and preferably by 95% or more. The present invention provides a collector for both airborne particulate material and organic vapors from which the combustible particulate material can be burned and the organic vapors desorbed without destroying the adsorbent material, a surprising feature in the view of the known flammability of activated carbon. The collector, of laminar construction, comprises an assembly of at least one layer, and up to four layers, each of adsorbent beds, metal screens, and refractory microfiber mats.

BRIEF DESCRIPTION OF DRAWINGS

In the accompanying drawing.

DETAILED DESCRIPTION

The process and apparatus of the invention will be more fully understood from the following description taken in conjunction with the accompanying figures. Reference numbers refer to similar parts throughout the several views of the figures.

Figure 1:
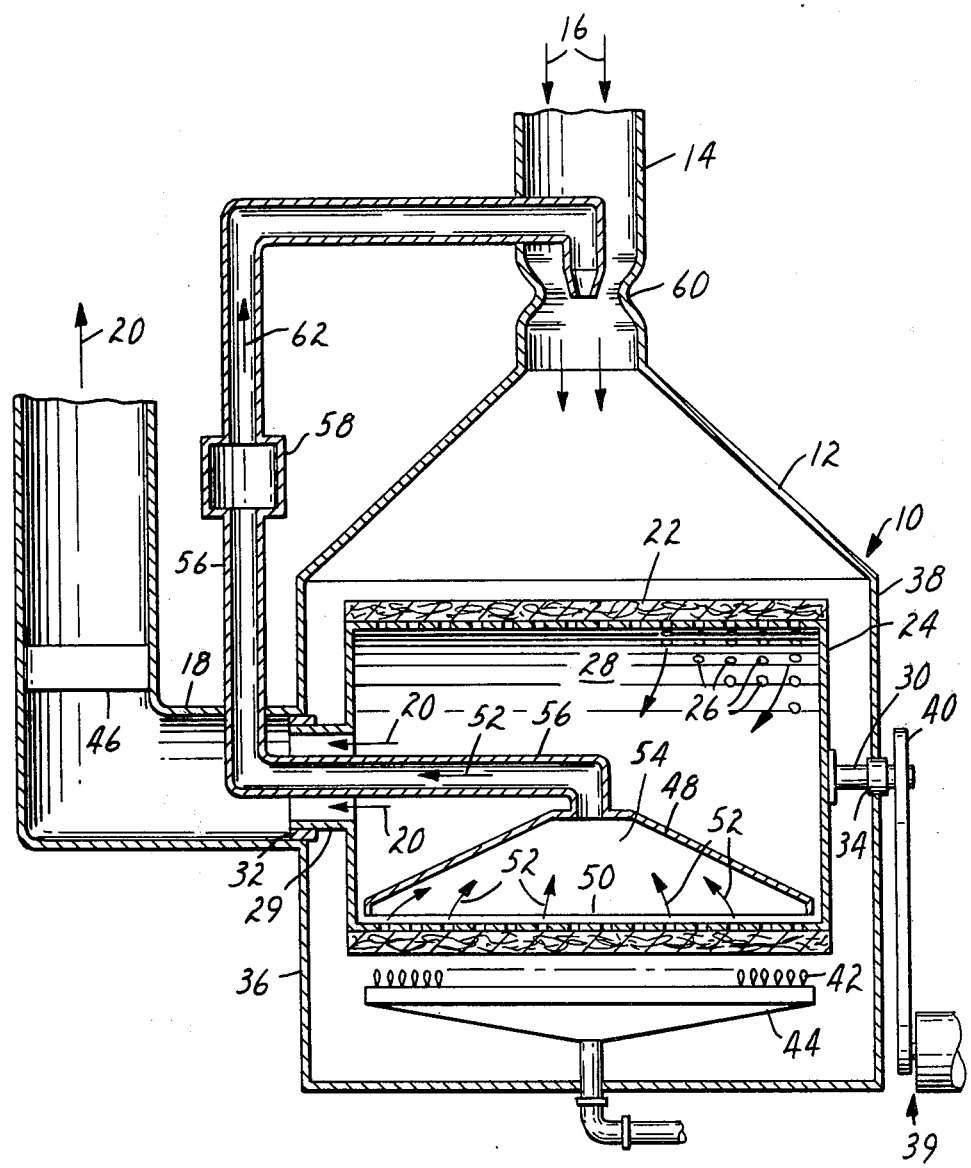
FIG. 1 is a transverse sectional view of a preferred apparatus illustrating one embodiment of the invention.

Referring to FIG. 1, there is shown a preferred embodiment 10 of the apparatus of the invention for the simultaneous removal of vaporous and combustible particulate pollutants from gas streams comprising housing 12, an inlet plenum 14 for conducting polluted gas streams 16 comprising vaporous and particulate materials into the housing 12, and outlet plenum 18 for conducting cleaned gas from the housing. Polluted gas 16 can be forced optionally from a source of pollution by blowers not shown or, preferably, pulled into inlet plenum 14 by blower 46 in exit plenum 18. The polluted gas 16 passes into the apparatus 10, fills housing 12, and is forced through rotatable collector 22 that is secured to the periphery of metal drum 24, which has perforations 26 in its cylindrical surface, into the drum interior 28. In passing through the movable collector 22, particulates and organic vapors in the polluted gas are deposited on and adsorbed by collector 22. Metal drum 24 is axially mounted for rotation within housing 12 on journals 29 and 30 that turn in bearings 32 and 34 respectively that are located in opposite walls 36 and 38 of housing 12. Journal 30 extends through bearing 34 in wall 38 and is driven rotationally by means 39, such as the belt driven sheave 40 shown. Journal 29 that turns in bearing 32 located in wall 36 is a metal tube of sufficient internal diameter to permit egress of cleaned gas 20 without appreciable pressure buildup within the housing into outlet plenum 18. Linear tube burner 44 is located within housing 12 so that flame 42 from burner 44 impinges across the width of movable collector 22. Within drum interior 28 is housing 48 having a funnel-like configuration with an open base 50 located in close proximity to the inner surface of drum 24 and directly across movable collector 22 from linear burner 44. Open base 50 has dimensions of length and width such that the area of collector 22 heated by flame 42 is essentially completely covered so that combustion products and desorbed vapors 52 released from collector 22 upon heating by flame 42 enter housing interior 54 and are pulled to oxidizer 58 by a blower, not shown, through pipe 56 or by venturi 60 in inlet plenum 14. Oxidized vapors 62 exiting oxidizer 58 are essentially pollutant-free and can be vented (not shown) to the atmosphere or optionally recycled to inlet plenum 14.

During operation, drum 24 is rotated, presenting successive portions of collector 22 first to incoming polluted air at a filtering and adsoring station located across inlet plenum 14 for the removal of particulate material and vapors by filtration and adsorption by collector 22, and second, at a combustion and desorbing station, to heat at a temperature of at least 600° C. on the exposed surface of collector 22 and about 200° C. to 450° C. at the vapor adsorber layer (described below) of collector 22. Under these temperature conditions the particulate material deposited onto the surface of collector 22 is burned and the vapors desorbed. The products of combustion of the particulate material and the desorbed vapors 52 pass into housing 48 and are conducted by pipe 56 to oxidizer 58 where they are completely oxidized. In this manner, the volume of vapors 52 is only about 10 to 20% of the total volume of polluted air 16 entering housing 12. By this concentration of vapors the energy requirement for burning of vapors is greatly reduced.

In the embodiment shown in FIG. 1, heat is supplied by flames 42 provided by the combustion of fuel issuing from linear tube burner 44 (e.g., Slot Burner, available form Selas Corporation of America, Dresler, Pa. 19025) in close proximity to the surface of collector 22. Optionally, heat can be supplied by an electrical resistance element or a focused infrared tubular quartz lamp having an elliptical reflector element. In accordance with the invention, drum 24 is rotated at a speed such that the temperature of the exposed surface of collector 22 having deposited particulate material thereon is raised at the combustion and desorbing station to about 600° C. in less than about 0.4 seconds and the vapor adsorber layer 84 in FIG. 2 (described below) is raised to a temperature between 200° and about 450° C., preferably 200° to about 400° C., in about the same time. Preferably the adsorbent material of the vapor adsorber layer has an air ignition temperature greater than 400° C.

The combustion and adsorbing station should be capable of heating the surface of a refractory material having a density between 4 and 40 mg per cubic centimeter and a coefficient of thermal conductivity of less than $5 \times 10^{-2}$ g-cal/sec $(cm^2)$ (°C./cm) to a temperature of at least 600° C. in less than about 0.4 seconds and preferably in less than about 0.1 second.

Generally, rotational speeds such that the surface speed of collector 22 is between 0.1 and 10 cm/sec allow for the attainment of these temperatures. At surface speeds greater than about 10 cm/sec, temperatures attained on the collector are reduced resulting in incomplete combustion and desorption from collector 22. At surface speeds of less than about 0.1 cm/sec, the temperature of the vapor adsorber layer 84 of collector 22 may reach above about 450° C. and bring about the combustion of the adsorber material when the adsorber material is activated carbon.

Movable collector 22 comprises laminar constructions of one or more metal screens, mats of refractory microfibers, and beds of gas adsorbent materials having a pressure drop across the laminae of less than about 300 mm, and preferably less than about 25 mm, of water. Generally, the collector has a total thickness of less than about 50 mm, preferably less than about 25 mm, and most preferably from about 10 mm to 15 mm, of which the gas adsorbent bed or layer has a thickness of about 1 to 20 mm, preferably 2 to 10 mm. It is unique with this invention to use such thin adsorbent beds. Thin adsorbent beds require much less energy for their regeneration, thereby resulting in economy to the user. In addition, the initial cost of a thin adsorbent bed is much less than where thick adsorbent beds are used. Although any solid gas adsorbent can be used, for example, alumina, silica gel, molecular sieves, adsorbent-impregnated refractory microfiber, or activated earths; the preferred solid adsorbent is activated carbon. Activated carbon having particle size of about 140 mesh is preferred; however, particle sizes from about 20 to 200 mesh can be used.

Figure 2:
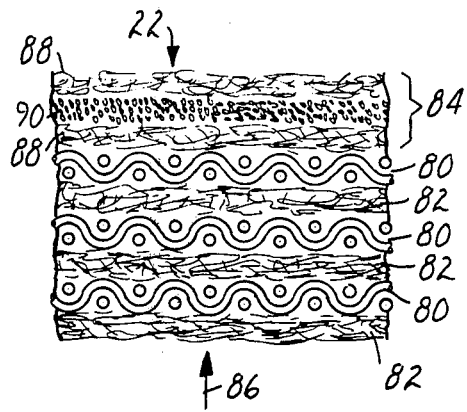
FIG. 2 is an enlarged portion of one embodiment of the movable collector of use in the apparatus of the invention.

The enlarged portion of one embodiment of movable collector 22 is illustrated in FIG. 2 in which there is provided a laminar construction of metal screens 80, mats of refractory microfibers 82, and gas adsorbent bed 84 (which consists of a layer of adsorbent material 90 between mats of refractive microfibers 88) and metal screens. Arrow 86 shows the direction of gas flow when collector 22 is over burner 44 in the operation of apparatus 10. The movable collector 22 of FIG. 1 has a cylindrical shape.

Figure 3:
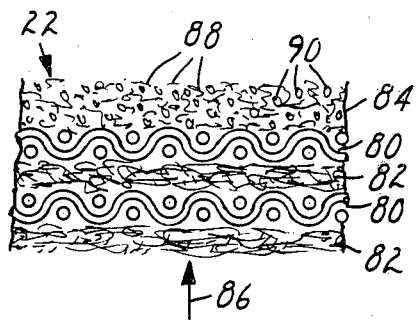
FIG. 3 is an enlarged portion of another embodiment of the movable collector of use in the apparatus of the invention.

FIG. 3 shows an enlarged portion of another embodiment of movable collector 22 in which gas adsorbent bed 84 comprises adsorbent material 90 loaded into refractory microfibers 88. The movable collector 22 of FIG. 3 has a cylindrical shape.

FIGS. 2 and 3 show movable collectors consisting of laminar construction having at least one gas adsorbent bed and several each of alternating metal screens and microfiber mats. Laminates of alternating layers of one to four of each of gas adsorbent beds, microfiber mats, and metal screens can be used provided that the overall construction has a thickness of no more than about 25 mm and a pressure drop of no more than 300 mm of water.

Metal screen 80 can be of any metal, but preferably is stainless steel having mesh size from about 20 to about 60. If the screen mesh is smaller than about 60, an undesirable pressure drop is caused, and it does not have the mass for a good heat sink. If screen mesh is larger than about 20, heat does not dissipate sufficiently fast from the collector to allow for adsorption of gases in the adsorption stage of the operation. By optimizing the mesh size and the carbon bed thickness it is possible to achieve a temperature in the carbon bed that is high enough to desorb the organic vapors but not so high as to cause combustion of the activated carbon.

As described above, gas adsorption bed 84 can be a layer of adsorbent material 90, preferably activated carbon, between layers of refractory microfibers 88 or it can be a layer of refractory or high temperature-resistant glass microfiber having impregnated therein adsorbent materials, preferably activated carbon. Bed 84 can also be an adsorbent material impregnated ceramic honeycomb. (Ceramic honeycomb structures are disclosed in U.S. Pat. No. Re. 27,747). A particularly desirable bed comprises a laminar construction of a sheet of expanded metal between layers of refractory microfibers in which the interstices of the expanded sheet are filled with activated carbon. An example of a suitable commercially available gas absorption bed is "CRANE-MAT", a filtration medium from Crane & Co., Inc., Dalton, Mass. 01226, which consists of a non-woven glass matrix containing about 20 percent by weight of activated carbon.

Preferred refractory microfiber mats 82 and layers 88 for use in movable collector 22 are prepared from fibers described in U.S. Pat. Nos. 3,713,865, 3,770,487, 3,793,041, 3,795,524, 3,853,567, 3,892,583 and 4,047,965. The microfibers described in U.S. Pat. No. 3,793,041 comprise a mixture of microcrystalline zirconia and amorphous silica in a mole ratio of 1.5:1 to 1:2, have diameters in the range of 10 to 40 μm and densities in the range of 1.5 to 4.3 g/cc. The microfibers described in U.S. Pat. No. 3,795,524 are aluminum borate or aluminum borosilicate having a mole ratio of alumina:boria of 9:2 to 3:1.5, have diameters of 10 to 15 μm or more. The microfibers described in U.S. Pat. No. 4,047,965 have mole ratios of alumina to silica that range from $3Al_2O_3.1.75SiO_2$ to $3Al_2O_3.2.19SiO_2$ (this corresponds to 67 to 77 weight percent alumina to 23 to 33 weight percent silica). Other suitable collector mats are prepared from refractory fibers such as the alumina fibers described in U.S. Pat. Nos. 3,950,478 and 3,982,955.

The term "refractory microfiber", as it is used in the present invention, is defined as a non-metallic, inorganic, amorphous, microcrystalline material or a mixture of amorphous and microcrystalline materials that are either vitreous or non-vitreous, are stable (i.e., do no melt or decompose) at temperatures of at least 600° C. (preferably at least 800° C.), preferably have a coefficient of thermal conductivity of less than 0.02 cal/-(sec)$(cm^2)$ (°C./cm) at 20° C., have an average diameter of about 0.1 to 20 μm and a length to diameter ratio of at least 1000. The composition of said refractory microfiber can be narrowly defined by the formulae

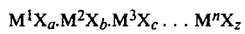

$$M^1X_a.M^2X_b.M^3X_c \ldots M^nX_z$$

wherein
  $M^1$, $M^2$, $M^3$, ... $M^n$ individually represent elements exclusive of periodic groups 6A, 7A and 8 of the Periodic Chart of Elements and hydrogen,
  n is the number of different elements present in the composition exclusive of hydrogen and Groups 6A, 7A and 8, X is preferably oxygen, but also includes nitrogen, carbon, or boron, (a,b,c, . . . z) are numbers (not necessarily whole integers) or zero which represent the empirical proportions of the different elemental compounds that they prefix, and at least one of a,b,c, . . . z may be represented as one, and a,b,c, . . . z individually represent the number of atoms of X for each atom of $M^1$, $M^2$, $M^3$, . . . $M^n$, respectively.

Examples of commercially available suitable refractory microfibers include Kaowool 2300 ® and Kaowool 2600 ®, alumina-silica fibers having 47% and 55% alumina respectively (available from Babcock and Wilcox); Saffil ®, a 95% alumina-silica fiber (available from Imperial Chemical Industries); boron-nitride fibers (available from Carborundum Co.); and zirconia fibers (available from Zircar Products Inc.).

Representative elements which are preferred as $M^1$, $M^2$, $M^3$, . . . $M^n$ include, but are not limited to silicon, aluminum, magnesium, boron, zirconium, calcium, chromium, hafnium, tantalum, tungsten, molybdenum, titanium, vanadium, lead, zinc iron, nickel, tin, copper and silver. Less preferred materials specifically include lithium, potassium, sodium, mercury, platinum and gold. The transuranic and translanthanide elements would also be less preferred.

The size and nature of the microfibers as described above are critical both for the ability of the filtering mass to catch volatile particulates and to hold the particulates when they are being combusted. Smaller fibers will merely hold the matter on the mat surface as if the mat were a flat surface, and larger fibers would not catch a large proportion of the particulates.

The collector mats 82 can have a thickness of from about 2.5 to 25 mm, preferably about 5 to 15 mm, the lower limits utilizing fibers of about 1 $\mu$m to less than about 20 $\mu$m in diameter and the upper limits utilizing fibers having diameters up to about 40 $\mu$m. Preferably, the fibers have a diameter of from about 1 to 5 $\mu$m. Bulk densities of the collector fiber mats can be between about 4 and 40 mg/cc and preferably between about 10 and 25 mg/cc. Collector mats having a thickness below about 2.5 mm decrease in effectiveness for stopping particulate material with decreasing thickness and collector mats having a thickness greater than about 25 mm have increased pressure drop across the collector without a corresponding increase in particulate stopping efficiency. A particularly desirable collector has an intermediate layer of coarse refractory microfibers (e.g., 10–100 $\mu$m diameter) of 10 to 15 $\mu$m thickness separating the collector mat 22 of fine microfibers (e.g., 5 to 15 $\mu$m diameter) of 5 to 10 mm thickness from the collector support 24. Means for removing uncombustible particulates collected on collector 22 at a position after the heat source by use of small tapping hammers is also contemplated.

Figure 4:
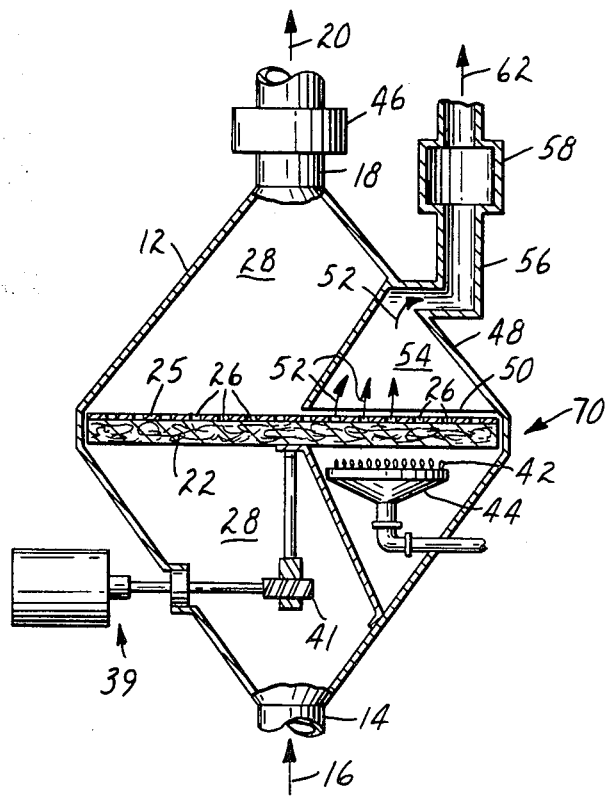
FIG. 4 is a transverse sectional view of another embodiment of the apparatus of the invention.

FIG. 4 shows another embodiment 70 of the apparatus of the invention wherein the movable collector 22 is secured to metal disc 25 having perforation 26 in its surface. In operation, disc 25 is rotated by means 41 presenting successive portions of the surface of movable collector 22 to polluted gas 16 then to heat means 42. Within interior 28 of housing 12 is housing 48 having open base 50 located in close proximity to the surface of movable collector 22 and directly across movable collector 22 from burner 44. Desorbed vapors and combustion products 52 released from collector 22 enter housing interior 54 and are pulled to vapor oxidizer 58 through pipe 56. Vapors 52 are oxidized in an oxidizer 58 from which oxidized vapors 62 exit and can be vented to the atmosphere or optionally recycled (not shown) to inlet plenum 14. Other parts of the apparatus of this embodiment have functions similar to those described for the embodiment of FIG. 1.

Vapor oxidizer 58 is preferably a catalytic oxidizer such as a "TORVEX" catalytic reactor manufactured by E. I. DuPont De Nemours and Company of Wilmington, De. Another useful vapor oxidizer 58 is a catalytic vapor oxidizer such as the "Honeycat ®" vent gas purifier manufactured by W. J. Inc. of Cleveland, Ohio. Other oxidizers that may be used include the various thermal or direct firing oxidizers which are well known in the art of pollution control. Still another means contemplated for use as vapor oxidizer 58 for organic vapors 52 is an ozonizer such as the "KT Fume Scrubber" Ozonator manufactured by Plastics Constructions, Ltd. of London, England, and described in "Process Engineering", p. 77 (Nov. 1974). In such a device, the desorbed vapors 52 are contacted with ozone for a sufficient time to oxidize substantially all of the desorbed vapors. Effluent 62, from the ozonizer is, preferably, returned to apparatus 70 via plenum 14 where unreacted ozone is decomposed and unoxidized organic substances are recycled.

Objects and advantages of this invention are further illustrated by the following example, but the particular materials and amounts thereof recited in this example, as well as other conditions and details, should not be construed to unduly limit this invention.

EXAMPLE

An apparatus in accordance with FIG. 1 was constructed to have movable collector 22 secured to the periphery of a drum of 1.6 mm (1/16 inch) stainless steel 30 cm in diameter and 13.5 cm long. The cylindrical surface was perforated with holes having a 3 mm diameter and spaced in a hexagonal array on centers 8 mm apart. Effective collector area could be adjusted by blocking off the perforations of the drum with strips of metal backed adhesive tapes placed about the drum to leave a desired collector area. Collector 22 could also be varied by placement of various materials as a belt over the exposed perforations. Inlet plenum 14 had a cross-sectional area of 0.018 m². Blower 46 was of conventional design and in the absence of collector 22 provided an exhaust volume of 9.3 m³ per minute. The exhaust volume could be varied by use of a damper (not shown) in the outlet plenum. Flow rates were measured by use of an "Alnor" thermoanemometer (available from the Alnor Instrument Company of Chicago) placed in the intake plenum 14. The combustible particulate containing gas stream was an aerosol containing 1270 mg/min of solids generated by atomizing a 10% solution in toluene of an Amberol ® M-82 (Rohm & Haas) phenolic resin at a pressure of 2.1 kg/cm² above atmosphere using an aerosol generator such as is described by Whitby et al, International Journal of Air and Water Pollution, 9, 263–277 (1965). The mean particle diameter of the aerosol at the point of entry to plenum 14 was 0.3 micrometers with none larger than 2 micrometers as determined by transmission electron microscopy.

The aerosol consisting of Amberol ® M-82 particulate matter was monitored at various locations in the apparatus by means of an Active Scattering Aerosol Spectrometer ® ASAS-300A (Particle Measuring Systems, Inc., 1855 South 57th Court, Boulder, Colo. 80301). The toluene vapor concentration in the gas stream was monitored using hnu ® Photoionizer Model PI-101 (hnu Systems, Inc. 383 Elliot St., Newton Upper Falls, Ma. 02164) whose signal was read continuously off a Hewlett-Packard ® 7100B strip chart recorder. Various rates of speed of the collector could be obtained by varying the voltage to the motor driven sheave 40. Heat source 44 was a natural gas fueled ribbon burner.

A movable collector was prepared by placing a refractory microfiber mat (10 mc wide×80 cm long) in the bottom of a 100 cm×30 cm container containing water at a depth of about 25 mm. A slurry of 100 g of 140 mesh activated carbon, WITCARB® AC7965 (from Witco Carbon Co., 277 Park Avenue, New York, NY 10017) was uniformly and slowly poured into the containers. After allowing the mixture to settle for about 30 minutes, the water was drained from the container leaving a layer of carbon deposited on the refractory microfiber mat. While the carbon was still wet, a second refractory microfiber mat was placed on top of the carbon layer to form a sandwich. This sandwich was then removed from the container and mounted onto the collector drum of the apparatus and secured in place with ceramic thread. The sandwich was allowed to dry. There was then fastened onto the sandwich alternately three each of 25 mesh stainless steel screen and refractory microfiber mat. The resulting collector had an overall thickness of about 10 mm of which the activated carbon layer was 2 mm.

A platinized ceramic honeycomb catalyst element (as disclosed in U.S. Pat. No. 4,206,083, EXAMPLE 1) was introduced into pipe 56 along with a 2000 watt electric heating element used to bring the air stream temperature up to about 400° C. which was the oxidizing temperature of the catalyst element while a gas flow of 0.14 m$^3$/min was passing through it, while the total air flow through the apparatus was 0.77 m$^3$/min. The results are shown in TABLE I where the reduction in particulate (on a mass basis) is better than 99% and the reduction in toluene concentration is better than 89%, indicating a total reduction in carbonaceous matter of 98%.

TABLE I

| Sample | Particulate (Counts) | | Toluene (ppm) |
|---|---|---|---|
| | Range 0.2–0.6 micron | Range 0.2–3.0 micron | |
| Upstream 16 | 15301 | 2595 | 458 |
| Downstream 20 | 416 | 23 | 51.5 |
| Secondary exhaust before catalyst 52 | 9205 | 0 | 1004 |
| Secondary exhaust after catalyst 62 | 280 | 0 | 0.4 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A process for removing volatile particulate material and organic vapors from a polluted air stream, said process comprising the steps of:
   a. providing said polluted air stream for entrance into an inlet plenum of an apparatus housing, said apparatus housing having a rotatable collector and burner located therein, said rotatable collector by its position being
      (1) a filtering and adsorption station for particulate matter and organic vapors, and having connecting means therefrom to an outlet plenum for exhausting the resultant pollutant-free air stream, and
      (2) a combustion and desorption station for combustion of particulate matter and desorption of organic vapors,
   b. collecting particulate material and organic vapors from said air stream at said filtration and absorption station in said collector to form an essentially pollutant-free effluent, said collector comprising an assembly of layers of refractory microfiber mats, metal screens, and vapor adsorbents, one of said refractory microfiber mats being on the exposed surface of said collector adjacent to said burner and being capable of withstanding temperatures of at least 600° C. produced by said burner, the microfibers having diameters in the range of 0.1 to 40 m and said microfiber mats having a thickness in the range of 2.5 to 25 mm and a bulk density in the range of 4 to 40 mg/cc, and one of said vapor adsorbent layers which is capable of withstanding temperatures up to 450° C. being on the inner surface of said collector, said collector having a pressure drop of less than 300 mm of water,
   c. burning said collected particulate matter and simultaneously desorbing said collected organic vapors, at said combustion and desorption station in said collector, to form a concentrated stream comprising combustion products of particulate material and desorbed vapors,
   d. oxidizing the desorbed vapors of the concentrated stream in an oxidizing means in said apparatus to form an essentially pollution-free oxidized stream comprising both particulate material combustion products and vapor combustion products, and
   e. exhausting, separately, the essentially pollutant-free effluent of step b. and the essentially pollutant-free oxidized stream of step d.

2. The process according to claim 1 wherein the concentrated stream of step (c) comprises up to about 20% of the total volume of the entering air stream of step (a).

* * * * *